UNITED STATES PATENT OFFICE.

ANNE-MARIE DE MONTESSUS DE BALLORE, OF TUNIS, TUNIS, ASSIGNOR TO SOCIÉTÉ ANONYME POUR LA FABRICATION DES PATES À PAPIER DE LIN ET SUCCEDANÉS, OF TUNIS, AFRICA.

CHEMICAL PROCESS FOR THE TREATMENT OF THE STRAW OF FLAX OR OTHER PLANTS.

No. 921,502.    Specification of Letters Patent.    Patented May 11, 1909.

Application filed April 17, 1906. Serial No. 312,276.

*To all whom it may concern:*

Be it known that I, ANNE-MARIE (named FLEURY DE MONTESSUS DE BALLORE, a citizen of the Republic of France, residing in Tunis, Tunis, engineer, have invented certain new and useful improvements in chemical processes for the treatment of the straw of flax and other plants for separating the utilizable fibers from the wood, of which invention the following is a full, clear, and exact description.

The present invention has for its object a chemical process for the treatment of the straw of flax and other plants for the purpose of separating the utilizable fibers from the wood. The separated fibers are transformed into paper pulp, while the wood may be collected and utilized for the manufacture of cardboard, common paper or for other purposes.

The process comprises a special chemical treatment succeeded by methodical washing and it is this combination that constitutes the invention, permitting of utilizing the straw of flax and other similar plants which is not used industrially, when they have been grown for the production of grain and not of textile material.

The chemical treatment is based upon the fact that the fibers are a "pecto cellulose" ($C_{12}H_{10}O_{10}$) while the wood is constituted by the "ligno cellulose" ($C_{12}H_{18}O_9$) and that these substances do not behave in the same manner in the presence of bases and oxidants.

The straw to be treated is first of all crushed and vigorously fanned upon gratings in order to free it from stones, dust and other impurities that it contains. This preliminary crushing is not indispensable but it facilitates the chemical treatment and permits of employing weaker baths; further, crushed straw is more readily penetrated by the chemical agents which act in a more uniform manner. This cleaned straw is then subjected to a first treatment for the purpose of dissolving the cement which unites the fibers one with the other and causes the bundles of fibers to adhere to the wood. This treatment may consist in retting in the open or it may be based upon the action of steam in the presence of air; treatment with soda is also applicable. The mixture of non-adherent fibers and wood is then subjected to the action of an oxidant in the presence of steam; this oxidant may be free chlorin or hypochlorite of lime, for example. This operation should be conducted in a suitable manner and stopped at the precise moment at which the wood is sufficiently oxidized, while the fiber has not yet undergone any transformation. Finally the material is raised to a temperature approximating 150° C. in the presence of an alkaline bath, the most advantageous composition of which is as follows:

Caustic soda (NaOH) _____ 20
Carbonate of soda ($Na_2CO_3H_2O$) __ 50
Sulfate of soda ($Na_2SO_4$) _____ 20
Sulfite of sodium ($NaSO_4$) _____ 10
                                    ———
                                    100

By appropriately conducting these three operations, the order of which may be varied, the result is attained that the wood is completely resolved without attacking the fiber, so that methodical washing upon metallic gauzes of suitable number or coarseness, permits of eliminating all traces of wood and of obtaining pure fiber. This latter is then transformed into paper pulp by the ordinary processes of bleaching, breaking and so forth. The wood may be collected, by decantation, in appropriately arranged tanks, for utilization in the manufacture of cardboard and packing paper.

What I claim and desire to secure by Letters Patent of the United States is:—

1. The treatment of flax, straw and the like for the purpose specified which consists in eliminating therefrom the binding gums which unite the pecto and ligno cellulose structures, oxidizing the ligno cellulose without injuriously affecting the pecto cellulose and recovering the ligno and pecto cellulose by decantation separately by passing the same through a strainer adapted to retain the pecto cellulose fibers alone, and subsequently recovering the ligno cellulose from the suspension water, substantially as described.

2. The treatment of flax, straw and the like for the purpose specified, which consists in eliminating therefrom the binding gums which unite the pecto and ligno cellulose structures, oxidizing the ligno cellulose without injuriously affecting the pecto cellulose by subjecting the cellulose mass to suitably oxidizing and alkalizing treatment and recovering the ligno and pecto cellulose by decantation separately by passing the same through a strainer adapted to retain the pecto cellulose fibers alone and subsequently recovering the ligno cellulose from the suspension water, substantially as described.

3. The treatment of flax, straw and the like for the purpose specified, which consists in eliminating therefrom the binding gums which unite the ligno and pecto cellulose structures, subjecting the cellulose mass to the action of an oxidant in the presence of steam sufficiently to oxidize the ligno without injuriously affecting the pecto cellulose, subjecting the mass to an alkali bath at a temperature of approximately 150° C. and recovering the ligno and pecto cellulose by decantation separately by passing the same through a strainer adapted to retain the pecto cellulose fibers alone and subsequently recovering the ligno cellulose from the suspension water, substantially as described.

In testimony whereof I have signed my name to this specification, in the presence of two subscribing witnesses.

ANNE-MARIE DE MONTESSUS DE BALLORE.

Witnesses:
RICHARD PRIANI,
J. B. DE MATTY.